Oct. 18, 1932.　　　H. W. ZIMMERMAN　　　1,883,285
REAMING AND BURNISHING TOOL
Filed Feb. 14, 1929　　2 Sheets-Sheet 2
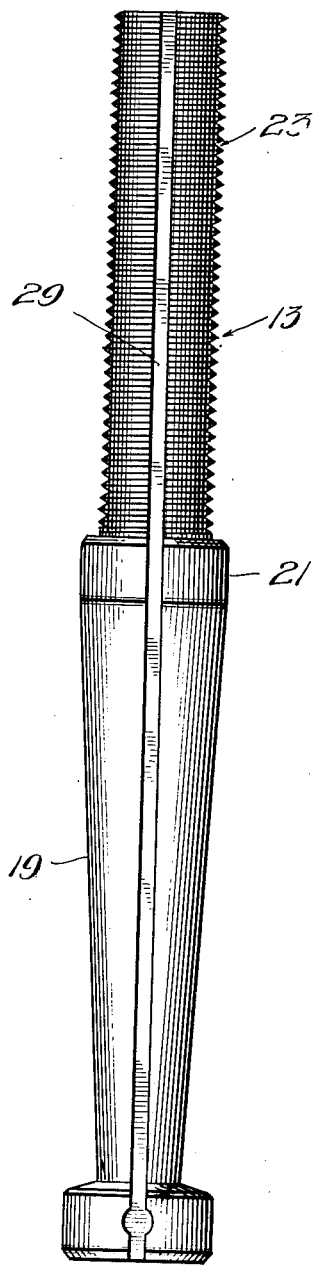
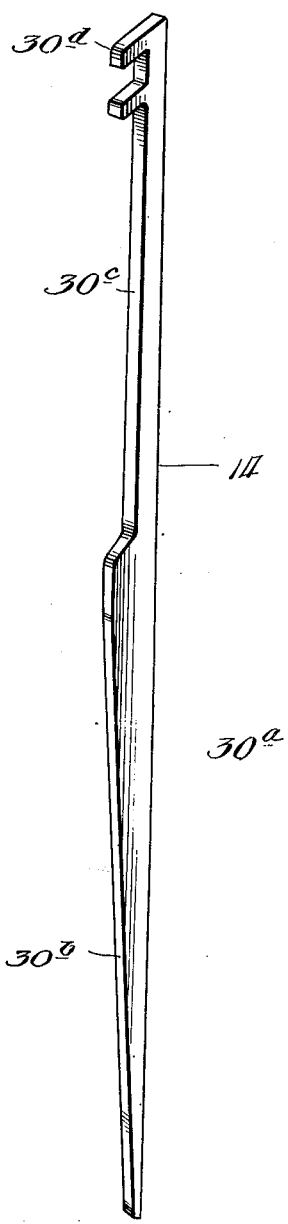
Inventor:
Herman W. Zimmerman
By Rector, Hibben, Davis & Macauley
Attys.

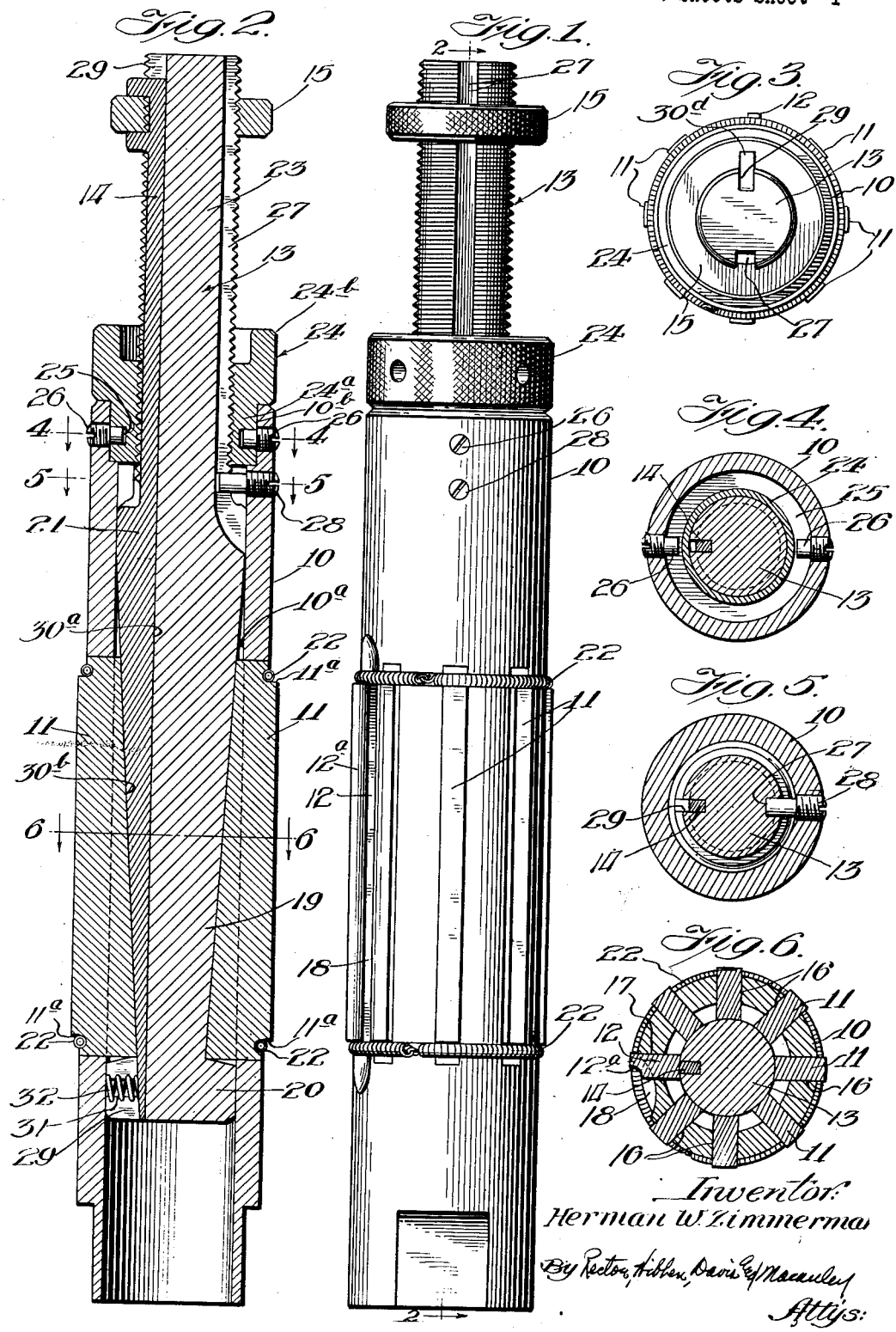

Patented Oct. 18, 1932

1,883,285

UNITED STATES PATENT OFFICE

HERMAN W. ZIMMERMAN, OF CHICAGO, ILLINOIS, ASSIGNOR TO AUTOMOTIVE MAINTENANCE MACHINERY CO., OF CHICAGO, ILLINOIS, A CORPORATION OF ILLINOIS

REAMING AND BURNISHING TOOL

Application filed February 14, 1929. Serial No. 339,756.

My invention relates to reamers, and has to do primarily with tools of this character adapted for reaming connecting rod, and other, bearings such as are commonly employed in automotive construction.

One of the objects of my invention is to provide a greatly improved reamer which is quite simple and inexpensive and which embodies a plurality of independent, blunt-face burnishing guides and a cutting blade, the guides and blade being simultaneously expansible and contractible to the same extent, and the cutting blade being expansible and contractible independently of the guides.

Another object is to provide a reamer which is easy to operate, and which insures greater reaming accuracy, greater flexibility and ease in adjustments of the guides and cutting blade, all of which greatly reduces the time required for the reaming of bearings and, consequently, reduces the cost of such operations.

A further object is to provide a tool embodying the foregoing features which may be readily and efficiently used by an unskilled workman as both a burnishing tool and a reaming tool.

An additional object is to provide improved, accurate adjusting means which is self-locking in any position of adjustment.

Other objects are to provide for positively positioning the burnishing guides and cutting blade against lateral and longitudinal displacement or disalignment; to provide for ready and quick removal of the cutting blade and burnishing guides without disassembly of the tool parts, whereby replacements and repairs to these parts, and the tool as a whole, may be made very easily and quickly; to provide for a wide range of expansion and contraction of the cutting blade and burnishing guides without sacrificing strength, cutting accuracy and cutting ability; to provide a reaming tool of the foregoing character wherein, once the projection difference between the cutting blade and the guides is established, this difference need not be changed during the cutting of a bearing, thereby eliminating the necessity of repeated measurements of the bearing and tool and resetting of the tool parts during the reaming of a bearing; and to provide a tool which will effect a smooth cut without "chatter" or "digging in".

Other objects and advantages will become apparent as this description progresses and by reference to the drawings wherein,—

Figure 1 is an elevational view of one form of tool embodying my invention, the burnishing guides and cutting blade being shown in their contracted positions;

Fig. 2 is a vertical sectional view taken substantially on line 2—2 of Fig. 1;

Fig. 3 is a top plan view of the tool shown in Fig. 1;

Fig. 4 is a horizontal section taken substantially on line 4—4 of Fig. 2;

Fig. 5 is a horizontal section taken substantially on line 5—5 of Fig. 2;

Fig. 6 is a horizontal section taken substantially on line 6—6 of Fig. 2;

Fig. 7 is a separated elevational view of the cone-spreader which is adjustably associated with the cutting blade and burnishing guides for expansion and contraction movements of the same.

Fig. 8 is a separated perspective view of a bar which is adjustably associated with the cutting blade.

The form of reamer which I have chosen to illustrate my invention includes generally a body 10 which rigidly supports a plurality of burnishing guides 11 and a cutting blade 12 for expansion and contraction movements, such movements being effected by longitudinal adjustment of a cone-spreader 13 which is so adjustably associated with each of the guides and the blade that they may be simultaneously adjusted, each to the same extent. The cutting blade is adjustable independently of the guides 11 by means of the slide bar 14 (Fig. 8) controlled by the nut 15.

Specifically, the body 10 is provided with a cylindrical bore $10^a$ extending throughout its length. The mid-portion of this body is provided with a plurality of equi-distant, radially extending rectangular slots 16 (Fig. 6) which snugly receive the burnishing guides 11 for radially sliding movements. The body is also provided with a slot 17, similar to the slots 16, which receives the cutting blade 12. The body is grooved at 18, in front of the cutting blade 12, to provide a chip-receptive space.

The burnishing guides and cutting blade are provided with flat sides and straight end edges which have snug sliding engagement with the corresponding surfaces of the body slots 16 and 17, thereby effecting rigid support of the same, at all times, against lateral and longitudinal displacement or disalignment. This is a necessary practical requirement in a tool of this character to provide maximum accuracy and true-cutting efficiency. The outer edges or faces of the burnishing guides are blunt, and they are rounded to approximate the shape of the bearing surface with which they contact so that they have no effect upon the bearing surface except to burnish and guide the tool in the bearing. The cutting blade is provided at its outer edge or face with a cutting edge 12$^a$. The inner edges of the guides 11 and blade 12 are each tapered longitudinally in the same manner and to the same extent to provide for simultaneous, identical spreading and contracting movements of the same as will be explained more fully hereinafter.

The cone-spreader 13 is received within the cylindrical body bore 10$^a$, and it, preferably, takes the shape shown in Fig. 7. Specifically, it is provided with a lower cone-shaped portion 19 which is tapered complementally to taper of the inner edges of the burnishing guides and cutting blade. Cylindrical guide-bearing portions 20, 21 are provided at the opposite ends of the tapered portion 19, and these cylindrical surfaces snugly engage the cylindrical bore of the body for guided movement of the spreader 13 therewithin. The burnishing guides are yieldably supported in their body guide slots with their inner edges in engagement with the cone-surface 19 by spring rings 22 mounted in grooves 11$^a$ at their opposite ends. The cutting blade 12 is, likewise, operatively associated with the cone 19 as will be more specifically described hereinafter. The upper or outer end portion 23 of the cone-spreader is reduced and externally threaded to receive the adjusting nut 24.

The nut 24, while being free to rotate, is held against longitudinal displacement as follows: It is provided with a depending, reduced cylindrical portion 24$^a$ (Fig. 2) which extends into the upper, enlarged end 10$^b$ of the body bore and the larger, knurled portion 24$^b$ of this nut seats upon the top edge of the body. A circumferential groove 25 in the depending part 24$^a$ of the nut freely receives the inwardly projecting ends of the diametrically opposed, body-carried pins 26.

It is obvious that with this arrangement the cone-spreader 13 may be moved longitudinally in a direction dependent upon the direction of rotation of the nut. Non-rotation of the cone-spreader during the foregoing adjustment is accomplished by providing in its reduced portion 23 a longitudinal slot 27 which freely receives the inwardly projecting end of the body-carried pin 28.

Adjustment of the cutting blade simultaneously with and independently of the burnishing guides is accomplished as follows: The cone-spreader is provided with a radial longitudinal straight-walled slot 29 (Figs. 2 and 7) extending throughout its length, which slot receives the cutting blade support bar 14 (Figs. 2 and 8). The inner edge 30$^a$ of this bar is straight and seats and slides upon the inner straight-walled surface of the spreader slot 29. The other edge of the lower part 30$^b$ of this bar is tapered similarly to the taper of the adjacent cone surface of the spreader 13, and the spreader slot is of such depth that when the bar 14 assumes the position therein indicated in Fig. 2, its outer edge surface will lie flush with the adjacent tapered surface of the spreader. The upper or outer portion of this bar 14 is reduced in width as at 30$^c$ so that such portion will lie beneath the threads of the reduced spreader portion 23 and will not interfere with rotative adjustment of the nut 24. The outer end of the bar 14 has a lateral bifurcate extension 30$^d$ which embraces the adjusting nut 15 mounted upon the reduced threaded end of the spreader, exteriorly of the adjusting nut 24. The tapered surface of the bar 14 is complemental to the taper of the inner edge of the cutting blade and the cutting blade is, obviously, contractible and expansible independently of the burnishing guides 11 by merely rotating the nut 15 in the desired direction. The spring rings 22 hold the cutting blade frictionally engaged with the tapered edge of the bar 14. The spreader bearing 20 is recessed into the spreader slot 29 at 31 (Fig. 7) to provide a chamber which receives a spring 32. This spring, in the assembled position of the tool, seats upon the bar 14 to insure proper seating of the latter in the slot 29 at all times. The upper portion 24$^b$ of the nut 24 is recessed to receive the bifurcate extension 30$^d$ on the bar 14 and permit the nut 15 to be moved down against the nut 24.

When it is desired to dress a bearing, the operator may first determine the extent of cut which should be made in the bearing. The tool is then inserted in the bearing (if it is not already there) and the nut 24 is adjusted counterclockwise (looking at Fig. 3) to move the spreader 13 inwardly and expand the burnishing guides (and cutting blade) into snug, guiding engagement with the bearing surface. The nut 15 is rotated in a clockwise direction to project the cutting edge of the blade 12 say .001 inch beyond the faces of the burnishing guides. The bearing is then rotated upon the tool to make a .001 inch cut. The adjusting nut 24 is again rotated to expand the burnishing guides into guiding engagement with the enlarged bearing surface, the .001 inch difference-projection of the cutting blade remaining constant, and the bearing is again rotated. This operation is repeated as many times as the total cut requires. It is obvious that once the operator has made his preliminary measurements, no further measurements are required during the reaming of the bearing. The difference-projection of the cutting blade determines the amount of cut each time, which amount remains constant due to the arrangement wherein the cutting blade and burnishing guides are simultaneously adjustable to the same extent. This greatly reduces the time required for reaming a bearing, consequently reducing the cost of the operation. By using the cone-spreader for expanding the guides and blade, this operation is positive and accurate. The contracting movements of the guides and blade are, likewise, positive due to movement of the spreader to release these guides and blades and permit the spring rings 22 to move the same inwardly against only the friction offered by the body slots 16 and 17. Only a few parts are required for effecting these advantageous adjustments. The cutting blade and burnishing guides are mounted independently of each other and separately from their adjusting mechanism, so that they may be readily removed and replaced without disassembly of the tool. The cage-like body with its thick-walled slots provides a rigid support for the cutting blade and guides, and prevents displacement of the same in any direction, at all times, all of which is desirable in order that the tool perform efficiently and rapidly to cut a smooth and approximately true-cylindrical surface.

After the desired cut has been made, the nut 15 may be rotated in a counterclockwise direction (looking at Figs. 2 and 3) to retract the edge of the cutting blade to a point where the faces of the burnishing guides project therebeyond. The bearing may then be turned upon the tool in contact with only the faces of the burnishing guides to burnish and finish the cut bearing surface. The burnishing guides may be adjusted during this burnishing operation by rotation of the nut 24 without affecting the projection-difference between them and the cutting blade.

It will be obvious that while I have shown and described only two forms of my invention, other changes in the details and arrangements of the parts thereof may be made without departing from the spirit and scope of my invention as defined by the claims which follow.

I claim:

1. In a device of the class described, a body, a cutting blade and guide elements supported by said body for expansion or contraction movement, a cone-shaped expander member engaging complementally-shaped portions of said guide elements, means mounting said expander member in said body for longitudinal slide movement only, said expander member having a threaded extension projecting through and beyond one end of said body where it is constantly accessible, an adjusting device rotatably fixed in the latter-mentioned end of said body and engaging said threaded extension for longitudinally adjusting said expander member relative to said guide element, said expander member having a longitudinal groove along one side the base of which is substantially parallel with the axis of said expander member, an adjusting element of substantially the outline shape of said groove seated in said groove and adjustable to a position wherein its outer edge coincides with the cone-surface of said expander member, the outer edge of said element being engageable with a complementally-shaped portion of said blade, and means carried by said expander for sliding said element longitudinally in said groove to project its outer edge outwardly beyond the cone-surface of said expander member to independently project said blade relative to said guide elements.

2. In a device of the class described, a body having a central space with passages leading outwardly therefrom, a bore-engaging cutting blade mounted in one of said passages, bore-engaging guides mounted in other of said passages, a cone-shaped member slidably mounted in said center space and having its cone-surface engaging complementally shaped portions of said guides, means preventing rotation of said member in said body, an adjusting device screw-threadedly engaging said member and rotatably mounted on said body so as to be confined against longitudinal movement for adjusting said member longitudinally in said body, said member having a longitudinal groove therein the base of which is substantially parallel with the axis of said member, an adjusting element having a straight edge seated in said groove and longitudinally slidable therein and having its opposite edge tapered complementally to the taper of said member, the tapered edge of said element engaging a complementally-tapered portion of said blade, and another adjusting device rotatably connected to said element against relative longitudinal displacement, which other device screw-threadedly engages said member for moving said element longitudinally back and forth in said groove.

3. In a device of the class described, a body, a cutting blade and guide elements slidably supported by said body for expansion or contraction movement, a cone-shaped expanding member mounted in said body for longitudinal sliding movement only and engaging complementally-shaped portions of said guide elements, a longitudinal-axially-directed groove in said expanding member which has its base portion substantially parallel with the axis of said expanding member, an adjusting element mounted in said groove and having substantially the same outline shape and dimensions as said groove whereby the outer edge of said adjusting element may assume a position coinciding with the cone-surface of said expanding member or may be projected outwardly therebeyond by longitudinal sliding movement of said adjusting element in said groove, means for adjusting said expanding member longitudinally in said body without changing the then-existing relative positions of said adjusting element and said expanding member, and means for independently adjusting said adjusting element relative to said expanding member, said cutting blade having a surface complementally shaped to and engaging the outer tapered surface of said adjusting element whereby said cutting blade is expanded in said body as said expanding member is adjusted and as said adjusting element is independently adjusted.

In testimony whereof, I have subscribed my name.

HERMAN W. ZIMMERMAN.